United States Patent [19]

Huang

[11] Patent Number: 4,772,153
[45] Date of Patent: Sep. 20, 1988

[54] STRONG TIGHTENING DEVICE USED FOR BICYCLE'S FRAME JOINT

[76] Inventor: Gwo-Ming Huang, 387, Taichung Road, Taichung City, Taiwan

[21] Appl. No.: 881,215

[22] Filed: Jul. 1, 1986

[51] Int. Cl.⁴ .............................................. B60B 27/06
[52] U.S. Cl. .................... 403/344; 403/290; 403/373
[58] Field of Search ............... 403/344, 373, 377, 385, 403/DIG. 9, 290

[56] References Cited

U.S. PATENT DOCUMENTS

| | | | |
|---|---|---|---|
| 1,785,870 | 12/1930 | Marles | 403/313 |
| 2,909,381 | 10/1959 | Bates | 403/385 X |
| 3,767,235 | 10/1973 | Pitner | 403/344 |
| 3,895,878 | 7/1975 | Pitner | 403/373 X |
| 4,068,965 | 1/1978 | Lichti | 403/344 X |
| 4,269,445 | 5/1981 | Gager | 403/373 X |
| 4,361,024 | 11/1982 | Haldric | 403/373 X |

FOREIGN PATENT DOCUMENTS

| | | | |
|---|---|---|---|
| 595212 | 7/1925 | France | 403/373 |
| 623514 | 3/1927 | France | 403/344 |
| 705351 | 10/1967 | France | 403/344 |

OTHER PUBLICATIONS

Japan's Bicycle Guide, Riding the World, vol. 32, desk side edition, pp. 144–151, 1982.

*Primary Examiner*—Andrew V. Kundrat
*Attorney, Agent, or Firm*—Leonard Bloom

[57] ABSTRACT

This invention is related to a tightening device used for a bicycle's frame. This device includes a shell having an interior space having a pair of lugs formed thereon. A screw and a nut provides for selectively, adjustably tightening the said bracket. A tightening piece is confined and supported within each lug, each piece having a contact surface which communicates with the interior space of the bracket, the contact surface of the tightening piece is provided with a curvature being similar and complementary-shaped to that of the surface of the structural member. When the seat tube is inserted into the interior space and the nut is tightened, the said contact surface of the tightening piece tightens and contacts the surface of the tube firmly along an area being greater than a line.

3 Claims, 3 Drawing Sheets

FIG—1
PRIOR ART 4,772,153

STRONG TIGHTENING DEVICE USED FOR BICYCLE'S FRAME JOINT

FIELD OF THE INVENTION

The present invention is related to a bicycle's bracket shell, particularly to a bracket shell structure that provides reinforced locking function to bicycles frame tubes.

BACKGROUND OF THE INVENTION

Referring to FIG. 1, a bracket shell commonly used for bicycles in the prior art includes tubes 11 and 12 to which frame tubes are fixed to and welded to. Said tube 11 may have to serve as a joint for the seat tube 13 (or head tube). To facilitate adjustment of the seat height, a slot 14 is generally provided formed in the wall of the tube 11. On both sides of the slot a pair of jugs (lugs) 16 and 17, having respective joining holes 15 formed therein, are provided. Each of said jugs 16 and 17 are symmetrical to the other. One fixing bolt 19 and one nut 18 are also provided, the bolt 19 being received through the said joining holes 15 and the nut 18 being adjustably, threadably received on the forward end of the bolt 19, thereby securing said bolt 19 in place. As the seat tube 13 is inserted into the said tube 11 to a predetermined depth the tube 13 is clamped therein by said jugs (lugs) 16 and 17 being forced tight by means of the said bolt 19 and nut 18. The inner wall of the tube 11 will in turn force the seat tube 13 fixedly tight. However, since this form of structure does not provide firm fixation of the tube 13, the seat, being locked by the said bolt 19 is apt to slide down, especially when the road the bicycle is riding on is bumpy, causing injury to the bicycle rider.

In view of this, the inventor, based on his years experiences in designing and manufacturing bicycle's parts, found that such defect is caused by the shell's inner wall lack of overall tightening forces which are needed for the adequate tightening of the seat tube. All that it could provide is no more than one or two linear contact to the tube. Detailed analysis shows that the tube, being pressed or formed out of steel sheet, does not have such a good roundness (or shape) that perfectly matches (is complementary with) the seat tube. Due to the property of steel sheet to have low flexibility, the shell, while being tightened by means of bolt and nut, cannot provide enough roundness needed for the tightening of the seat tube. To solve this problem, the inventor, after a long time research, finally came up with the present invention.

SUMMARY OF THE INVENTION

It is therefore one of the primary purposes of the present invention to provide a strong tightening device for bicycle's frame head (joint). Said device provides a locking strength which is strong enough for fixing bicycle parts, such as seat tube, so as to secure such parts safely for the bicycle's riders.

It is a further purpose of the invention to provide a bracket shell having a strong tightening structure which accomplishes its tightening function by means of only a small part without either changing the original structure or increasing the expense thereof.

In accordance with the teachings of the present invention, a strong tightening device used for a bracket shell is provided including a shell (substantially hollow sleeve portion), a bolt and a nut to selectively, adjustably clamp the structural member of a bicycle similar to the prior art. However, the embodied device is characterized by two jugs (a pair of radially-extending spaced-apart lugs) each of said lugs having an accommodating space (a recess or cup-like space) formed therein in which a tightening piece (a tightening member) is provided. Each of said tightening pieces is provided having a curved (substantially arcuate) groove (contact surface) formed thereon in communication with the tube (the interior space). This contact surface has a curvature complementary to the surface of the tube's inner wall (the surface of the structural member). When the bolt and nut are tightened (moved into a first clamping position) while the seat tube is inserted into the interior space of said shell, substantially the entire curved groove (the contact surface) of the tightening piece is forced (clamped) against the surface of the seat tube (structural member) and thus brings about a contact with the surface of said seat tube (structural member) over an area being greater than a line, clamping the seat tube therein thus providing improved fixation and stability of the said tube.

To facilitate better understanding of the present invention in regard with its purposes, features and functions, a preferred embodiment is illustrated for explanation.

DESCRIPTION OF PREFERRED EMBODIMENTS

Figure 1:
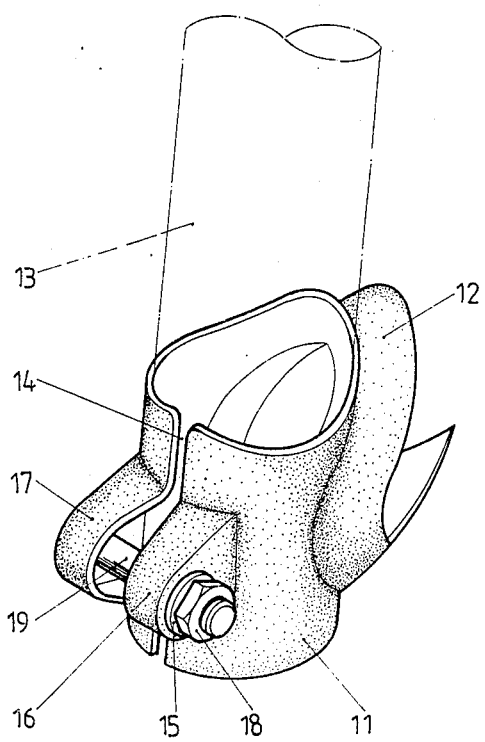
FIG. 1 is a 3-dimentional view of the bracket of the prior art.
Figure 2:
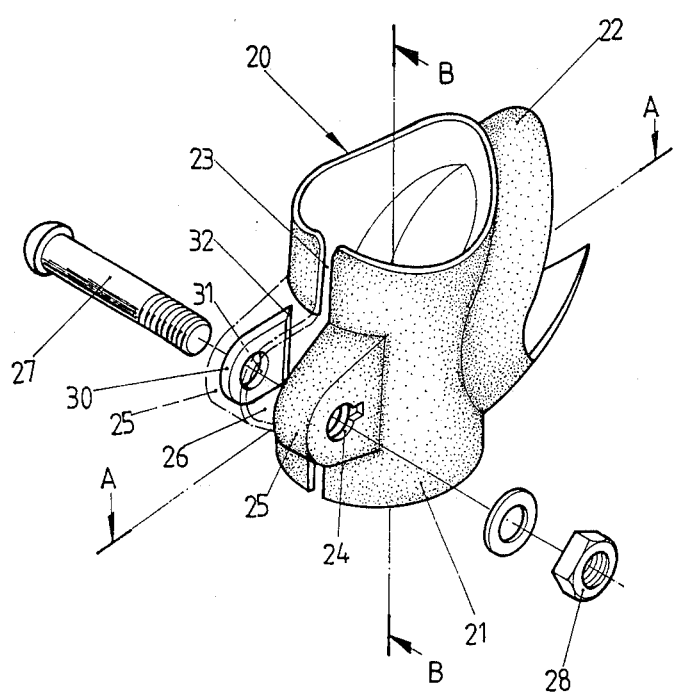
FIG. 2 is a 3-dimensional view of the bracket of the present invention.
Figure 3A:
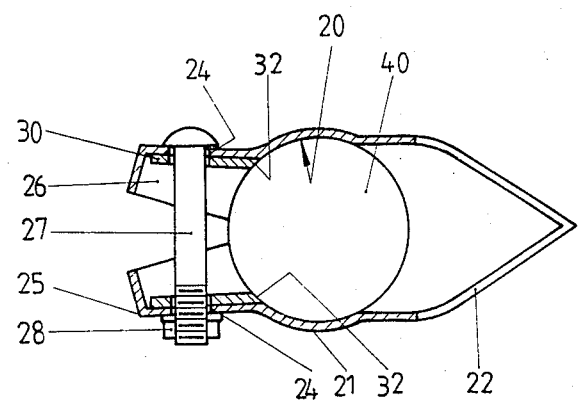
FIG. 3 A & B are the cross-sectional views of the bracket of the present invention taken, respectively, along the lines AA and BB of FIG. 2.
Figure 3B:
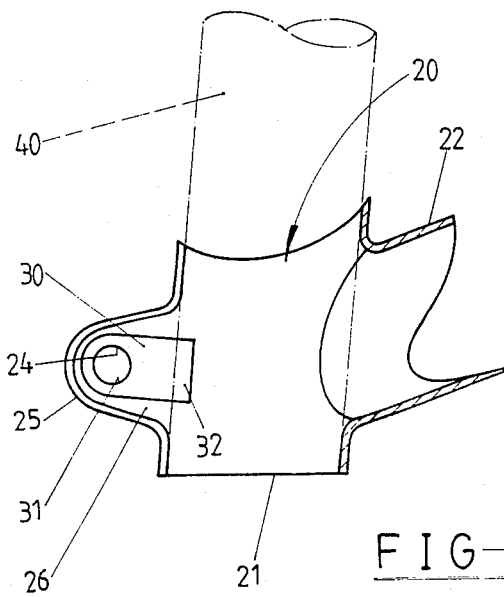

Referring to FIGS. 2, 3A and 3B, the shell (substantially hollow sleeve portion) 20 is formed from a single steel sheet by means of folding, stamping and pressing. The tubes 21 and 22 lean through (extend from) the shell. These two tubes 21 and 22 can be supported by the frame support and welded to it. A slot 23 is formed in the shell portion 21 in a portion thereof axially facing (diametrically positioned to) the opening of tube 22. Two symmetrical radially-extending, spaced-apart lugs 25 having joining holes 24 formed therein being positioned or formed on the sleeve portion on both sides of the said slot 23. Each of the lugs 25 has a recess or an accommodation space (cup-like space) 26 formed therein, each of said spaces 26 being spatially connected (being in communication with) with the inner hole (interior space) of the shell 21. Bolt 27 is received through the joining holes 24 of the said lugs 25 for selectively, adjustably moving the lugs 25 between a first clamping position, wherein the structural member is clamped in the bracket and a second releasing position, wherein the structural member(s) is released from the bracket, and is adjustably, threadably fixed thereto by a nut 28. All these structures are similar to the prior art. However, the present invention is specially characterized by one tightening piece 30 being welded or otherwise suitably secured to, confined and supported in, preferably each of the lugs 25 in the accommodating spaces 26 of the said lugs 25 for movement therewith. Said tightening piece 30 has a substantially arc-shaped support portion shaped substantially complementary to the space 26 besides having a hole 31 formed therein responding to and aligned with the joining holes 24 of the lugs 25 for receiving the bolt 27 therethrough while being spaced therefrom. Piece 30 also has a curved groove (substantially arcuately-shaped contact surface) at the part extending into (communicating with) the tube, said groove (contact surface) having a curvature similar to (substantially complementary with) the surface of the tube's inner wall or the surface of the structural member.

According to the features disclosed in the present invention, when the seat tube (structural member) 40 is inserted into the inner hole (interior space) of the shell (bracket) 21, and when the nut 28 is tightened up, the lugs 25 will be displaced in response to the force applied. Thus, the tightening piece 30 fixed thereto so that the support portion thereof contacts a respective lug in the accommodating space 26 along substantially the entire support surface is displaced. Such displacement will make the curved groove (contact surface) 32 abut, attaches tightly and contacts the outer surface of the seat tube 40 over an area being greater than a line, clamping the structural member therein. By this contact between the groove surface (contact surface) 32 and the inner wall of the tube (bracket) 21, with the seat tube 40 the tightening member is applied multi-directional facial forces between the support portion (surface) and the lug and the contact surface and the tube 40 which firmly fixes the seat tube 40 in the tube (bracket) 21. The seat's height can be adjusted by loosening the nut 28 which grooves the lugs 25 into their second releasing position. The lugs 25, being released from the tightening force, will return to their original second releasing position by their own elasticity. Thus, the contact surface of the tightening pieces 30 stops contacting is spaced from the surface of the seat tube (structural member) 40 and no longer provides tightening force releasing the structural member therefrom. Hence, the seat tube 40 could be moved up and down in the tube 11 until the desired height is achieved. Said seat tube can then be fixed again by the tightening of the nut 28 on the bolt 27.

What makes the present invention a strong tightening device is its transmitting the tightening force of the bolt 27 and nut 28 (means for selectively, adjustably moving the lugs) to the adjacent tightening piece 30, and the tightening piece can effectively force this strength to the seat tube 40. The said facial locking, added to by the contact over an area being greater than a line brought about in the tube's inner wall and the contact surface forms a stable, complementary supporting strength which, as compared to the prior art in which only 2 linear contacts are used, is much more advanced.

Another further feature of the present invention is that there is no need to change the shape and structure of the bracket shell. Therefore, any parts already in use can still be used. All what needs to be added is a small tightening piece, which, in respect to the cost and manufacture thereof, is very convenient.

To sum up, as the present invention has not been disclosed before, and because it adds much advances to the prior art in term of function without having to change its shape or structure, the present invention is truly an innovative creation.

What is claimed:

1. A bracket for supporting and clamping a structural member including a longitudinal axis and a surface, said bracket, in combination, comprising:

a substantially hollow sleeve portion defining an interior space therein for receiving the structural member;

a pair of radially-extending, spaced-apart lugs formed on the sleeve portion, each of said lugs having a recess formed therein, each of said recesses being in communication with the interior space;

means for selectively, adjustably moving the lugs between a first clamping position, wherein the structural member is clamped in the bracket and a second releasing position, wherein the structural member is released from the bracket; and a pair of tightening members, each of said members being positioned on a respective, radially-extending plane, each of said planes being parallel to the longitudinal axis, each of said members having a contact surface formed thereon positioned in the same plane as the tightening member, said contact surface being shaped substantially complementary to the surface of the structural member, each of said tightening members being positioned in a respective recess of the lug having the contact surface thereof in communication with the interior space for movement with the lug, said tightening member further positioned spaced from the means for moving the lugs; and each of the tightening members further having a support portion positioned in a plane being identical to that of the contact surface, such that each tightening member and the respective contact surface and support portions thereof are positioned in the same, identical plane being substantially parallel to the longitudinal axis, said support portion having a support surface being shaped substantially complementary to the recess, wherein when positioned in the recess, the support surface of each of the tightening members contacts a respective lug along substantially the entire support surface;

wherein in the first clamping position, each respective lug and the tightening member positioned therein are moved into respective planes being parallel to each other wherein substantially the entire contact surface abuts and contacts the surface of the structural member over an area being greater than a line, clamping the structural member therein, and further wherein in the second releasing position, the contact surface is spaced from the surface of the structural member releasing the structural member therefrom.

2. A bracket for supporting and clamping a bicycle frame having structural member including longitudinal axis and a surface, said bracket, in combination, comprising:

a substantially hollow sleeve portion defining an interior space therein for receiving the structural member;

a pair of radially-extending, spaced-apart lugs formed on the sleeve portion, each of said lugs having a cup-like space formed therein, each of said cup-like spaces being in communication with the interior space;

means for selectively, adjustably moving the lugs between a first clamping position, wherein the structural member is clamped in the bracket and a second releasing position, wherein the structural member is released from the bracket;

a pair of tightening members, each said members being positioned on a respective, radially-extending plane, each of said planes being parallel to the longitudinal axis, each of said members having a contact surface formed thereon positioned in the same plane as the tightening member, said contact surface being shaped substantially complementary to the surface of the structural member, each of said tightening members being positioned in a respective cup-like space of the lug having the contact surface thereof in communication with the interior space for movement with the lug, said tightening member further positioned spaced from the means for moving the lugs; and each of the tightening members further having a substantially arc-shaped support portion positioned in a plane being identical to that of the contact surface, such that each tightening member and the respective contact and support surfaces thereof are positioned in the same, identical plane being substantially parallel to the longitudinal axis said support portion having a support surface being shaped substantially complementary to the cup-like space, wherein when confined in the cup-like space, the support portion of each of the tightening members contacts a respective lug along substantially the entire support surface;

wherein in the first clamping position, each lug and the tightening member positioned therein are moved into respective planes being parallel to each other wherein substantially the entire contact surface abuts and contacts the surface of the structural member over an area being greater than a line, clamping the structural member therein, and further wherein in the second releasing position, the contact surface is spaced from the surface of the structural member releasing the structural member therefrom.

3. A bracket for supporting and clamping a bicycle frame including a structural member having a longitudinal axis and a substantially arcuate surface, said bracket, in combination, comprising:

a substantially hollow sleeve portion defining an interior space therein for receiving the structural member;

a pair of radially-extending, spaced-apart lugs formed on the sleeve portion, each of said lugs having a cup-like space formed therein, each of said cup-like spaces being in communication with the interior space;

means for selectively, adjustably moving the lugs between a first clamping position, wherein the structural member is clamped in the bracket and a second releasing position, wherein the structural member is released from the bracket;

a pair of tightening members, each of said members being positioned on a respective, radially-extending plane, each of said planes being parallel to the longitudinal axis, each of said members having a substantially arcuate contact surface formed thereon positioned in the same plane as the tightening member, said contact surface being shaped substantially complementary to the surface of the structural member, each of said tightening members being confined and supported in a respective cup-like space of the lug having the contact surface thereof in communication with the interior space for movement with the lug, said tightening member further positioned spaced from the means for moving the lugs;

each of the tightening members further having a substantially arc-shaped support portion, positioned in a plane being identical to that of the contact surface, such that each tightening member and the respective contact and support surfaces thereof are positioned in the same, identical plane being substantially parallel to the longitudinal axis, said support portion having a support surface being shaped substantially complementary to the cup-like space, wherein when confined in the cup-like space, the support portion of each of the tightening members contacts a respective lug along substantially the entire support surface; and wherein in the first clamping position, each respective lug and the tightening member positioned therein are moved into respective planes being parallel to each other wherein substantially the entire contact surface abuts and contacts the surface of the structural member over an area being greater than a line, clamping the structural member therein, and further wherein in the second releasing position, the contact surface is spaced from the surface of the structural member releasing the structural member therefrom.

* * * * *